E. L. HUTCHINSON.
Harvester-Rakes.

No. 154,253. Patented Aug. 18, 1874.

WITNESSES:

INVENTOR
E L Hutchinson
per: T. H. Alexander
ATTORNEY.

UNITED STATES PATENT OFFICE.

EDWIN L. HUTCHINSON, OF AUBURN, NEW YORK.

IMPROVEMENT IN HARVESTER-RAKES.

Specification forming part of Letters Patent No. 154,253, dated August 18, 1874; application filed April 30, 1874.

*To all whom it may concern:*

Be it known that I, EDWIN L. HUTCHINSON, of Auburn, in the county of Cayuga and State of New York, have invented certain new and useful Improvements in Self-Rakes for Reaping-Machines; and I do hereby declare that the following is a full, clear, and exact description thereof, reference being had to the accompanying drawings, and to the letters of reference marked thereon, which form part of this specification.

The nature of my invention consists in the construction and arrangement of an automatic rake for reaping-machines, whereby the grain is swept across and to the rear of the platform, as will be hereinafter more fully set forth.

In order to enable others skilled in the art to which my invention appertains to make and use the same, I will now proceed to describe its construction and operation, referring to the annexed drawing, in which—

Figure 1:
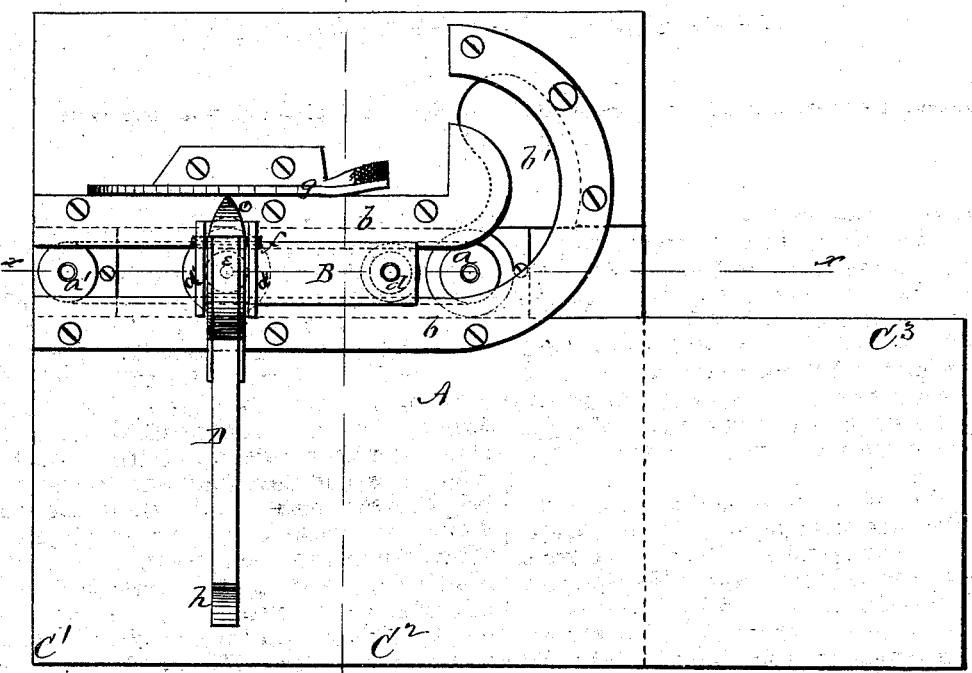
Figure 2:
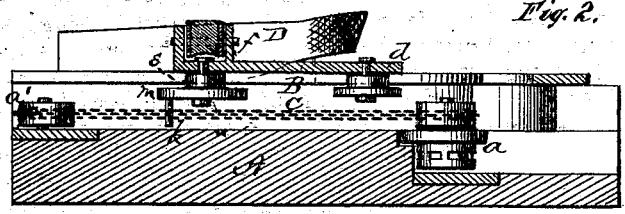
Figure 3:
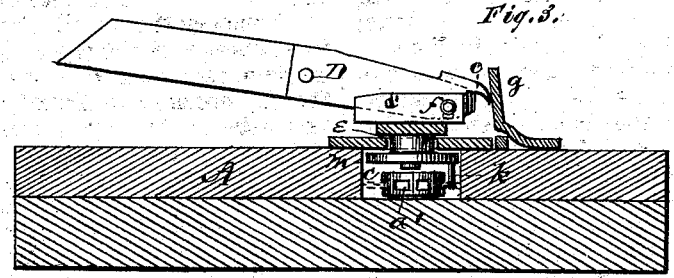

Figure 1 is a plan view of a reaper-platform with my automatic rake attached thereto. Fig. 2 is a longitudinal section of the same through the line $x\ x$, Fig. 1. Fig. 3 is a transverse vertical section of the same through line $y\ y$, Fig. 1.

A represents the platform of a reaping-machine, at the front edge of which, from $C^1$ to $C^2$, the cutter-bar is to be situated, $C^1$ being the place for the outer and $C^2$ for the inner shoe. On the platform A, a suitable distance in rear of the cutter-bar, are secured two guides, $b\ b$, running parallel with said cutter-bar, and their inner ends bent in semicircular form, as shown at $b'$. The platform is cut away the entire distance underneath these two guides, and in the groove thus formed are placed a single sprocket-wheel, $a'$, and a double sprocket-wheel, $a$, nearly opposite the points $C^1$ and $C^2$, respectively. Around the two wheels $a\ a'$ passes an endless chain, C. B represents a carriage, which projects over the guides or ways $b\ b$, and runs along the same on two rollers, $d$ and $e$, placed between them. To the carriage B is jointed the rake D, at the point $f$, in such a manner that it can rise and fall, as desired. $d'$ and $d'$ are supports securely fastened to the carriage B, which are intended to relieve the strain, which otherwise would be entirely upon the extreme inner end of the rake. On the inner or pivoted end of the rake D is a projection, $o$, bent as shown in Fig. 3. In rear of the rear guide $b$ is secured a guide board or bar, $g$, the inner end of which is bent or inclined, as shown in Fig. 1, for the purpose of elevating the rake upon its return. The outer end of this bar is beveled to allow the rake to fall down again gently onto the platform at or nearly at a line with the outer shoe. It is also a little lower at the end at which the rake starts, and then gradually increasing in height to the opposite end. Under the rollers $d$ and $e$ are washers $m\ m$, which project out under the ways $b\ b$ and prevent the carriage from rising; and upon the washer $m$, under the roller $e$, is a downward-projecting crank-pin, $k$. This washer turns freely on the same center as the roller $e$. The crank-pin $k$ is long enough to reach below the chain C, and passes through a link in the same, and hence always moves therewith. The distance from the center, from which the crank-pin $k$ swings, to the crank-pin itself is about the same as the radiuses of the wheels $a\ a'$, so that when the carriage is carried along by the chain until the center of the pulley $e$ stands directly over the center of the wheel $a$ the pin $k$ will swing around said wheel with the chain, and then return on the opposite side, taking the carriage with it; and, in like manner, when the pin $k$ reaches the wheel $a'$, it will swing around that wheel with the chain, and then pull the carriage back with it, so that the carriage will thereby obtain a continual reciprocating motion between the two wheels $a\ a'$. Motion is to be communicated to the sprocket-wheel $a$ and chain C by an endless chain running from a driver on the driving-wheel shaft to the lower sprocket $a$, or by any other suitable means.

When the machine is in motion, as the carriage approaches the double sprocket $a$, the roller $d$ passes over the same, and swings around in the circular part $b'$ of the guides, carrying the carriage and rake with it, so that by the time the center of the roller $e$ reaches a point directly over the center of the wheel $a$ the carriage and rake will stand at about a right angle with the endless chain, and after the crank-pin $k$ has passed around the wheel $a$ with the chain they will again be brought back to their former position. When the rake moves from the point $C^1$ (line of the outer shoe) on the platform toward the point $C^2$ (line of the inner shoe) it rests on the platform and sweeps the grain before it; and when at or near the point $C^2$ it swings, as above described, toward the rear, sweeping the grain off of the platform at the point $C^3$, or rear edge of the platform.

The pivot-hole $f$ of the rake is made elongated up and down, so that the shank of the rake can rise enough to permit the projection $o$ to pass over the top of the guide $g$ when the grain is being swept off; but on the return of the rake in the direction from $C^3$ to $C^2$, before it reaches this latter point, the projection $o$ will strike the inner bent end of the bar $g$, and be depressed thereby, so as to raise the rake to an angle of about forty-five degrees by the time it reaches the point $C^2$. The rake now, being raised, passes in this position to the point $C^1$, where it is gradually guided to its level position, and ready to again sweep off the cut grain.

The outer end $h$ of the rake D is beveled back, so that a reel may be used, and set low enough to reel in the shortest grain without interfering with the rake as it is sweeping the grain along the platform.

The wheel $a'$ may be made adjustable, to tighten the chain C if it should become slack by wear; and, instead of a chain, ropes or belts may be used, if so desired.

Having thus fully described my invention, what I claim as new, and desire to secure by Letters Patent, is—

1. The combination, with the guides $b$ and $b$, bent at their inner ends, as described, of carriage B, sprocket-wheels $a$ and $a'$, chain C, rollers $d$ $e$, washer $m$, and crank-pin $k$, substantially as and for the purpose set forth.

2. The combination of guide-bar $g$ with rake D, carriage B, and guides $b$ $b$, as and for the purpose set forth.

In testimony that I claim the foregoing as my own I have affixed my signature in presence of two witnesses.

EDWIN L. HUTCHINSON.

Witnesses:
C. C. BUTTON,
A. L. PALMER.